June 17, 1952  J. H. JEFFREE  2,600,877
DEVICE FOR MIXING FLUIDS
Filed Sept. 29, 1949  4 Sheets-Sheet 1
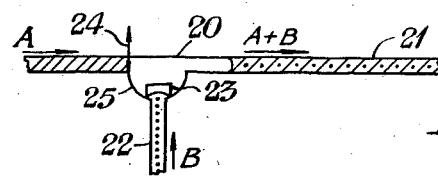
FIG. 1.
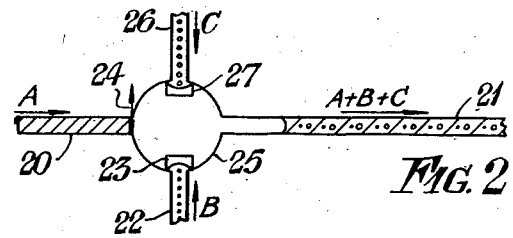
FIG. 2.
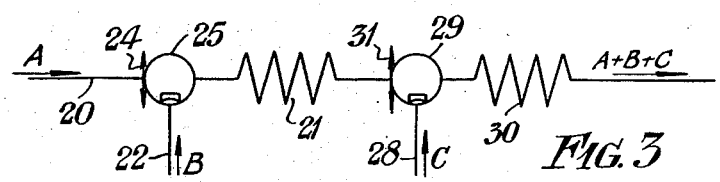
FIG. 3.
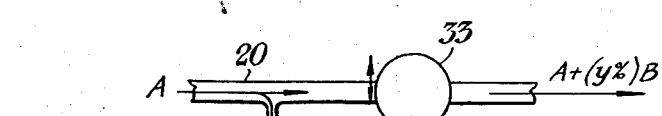
FIG. 4.
FIG. 5.
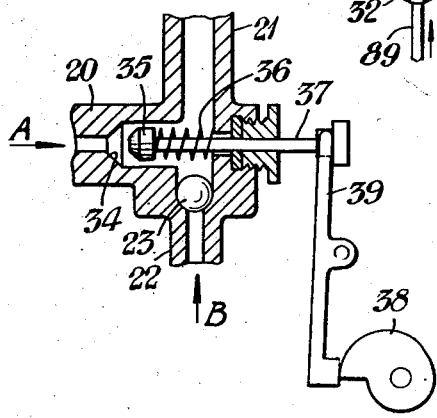
INVENTOR
J. H. JEFFREE
By Malcolm W. Fraser
ATTORNEY June 17, 1952 J. H. JEFFREE 2,600,877
DEVICE FOR MIXING FLUIDS
Filed Sept. 29, 1949 4 Sheets-Sheet 2
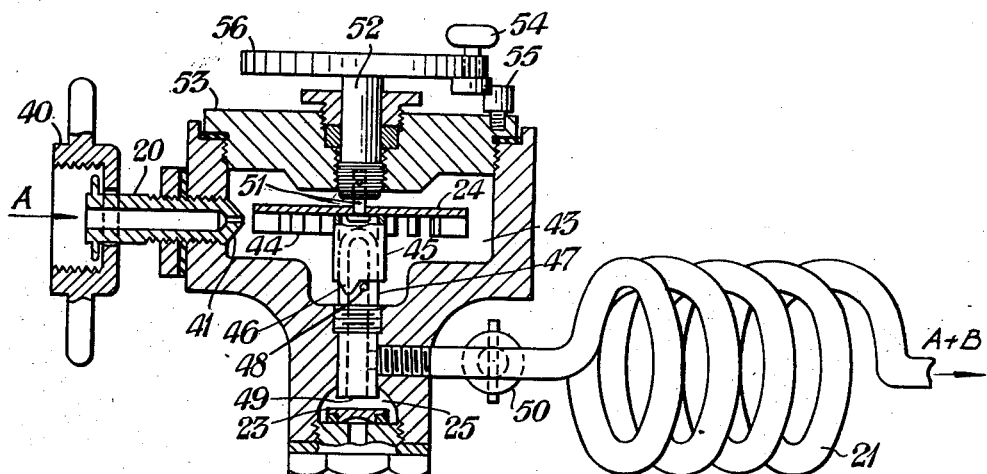
FIG. 6.
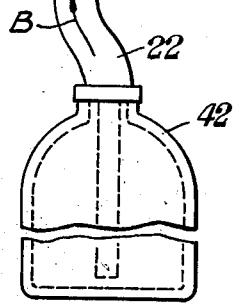
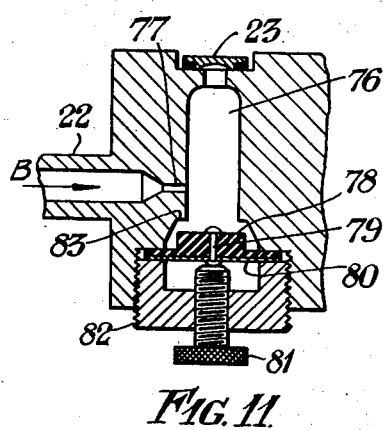
FIG. 11.
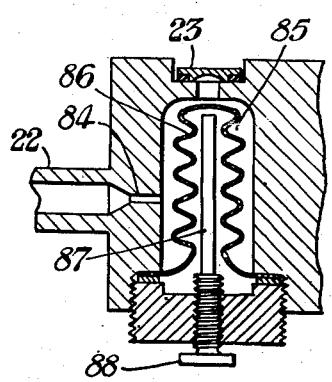
FIG. 12.
INVENTOR
J. H. JEFFREE
By Malcolm W. Fraser
ATTORNEY

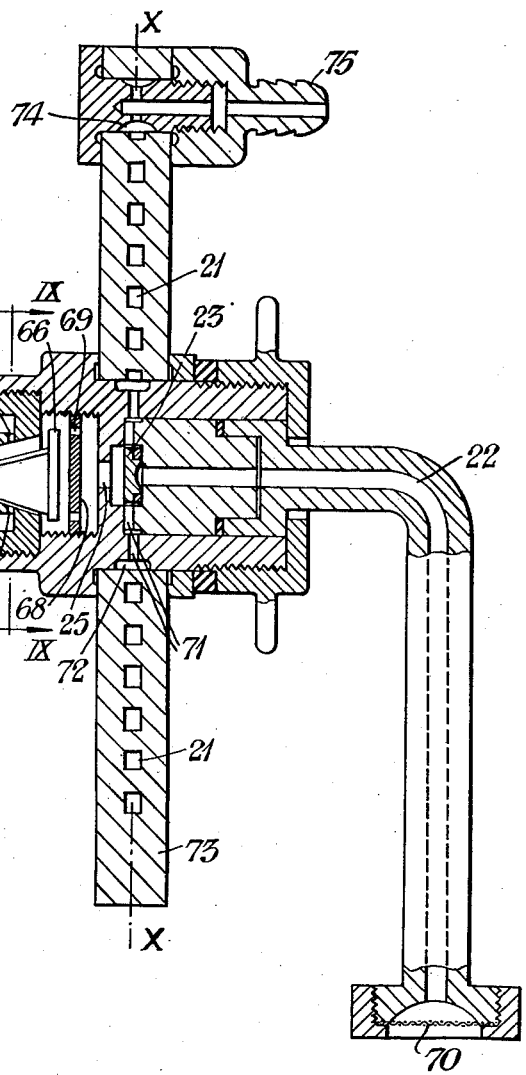

June 17, 1952     J. H. JEFFREE     2,600,877
DEVICE FOR MIXING FLUIDS

Filed Sept. 29, 1949.     4 Sheets-Sheet 4

INVENTOR
J. H. JEFFREE

By Malcolm W. Fraser
ATTORNEY

Patented June 17, 1952

2,600,877

UNITED STATES PATENT OFFICE 2,600,877

DEVICE FOR MIXING FLUIDS

John Henry Jeffree, Cobham, England

Application September 29, 1949, Serial No. 118,501
In Great Britain June 9, 1948

7 Claims. (Cl. 299—84)

The present invention relates to an improved method and means for mixing fluids.

Although not exclusively limited thereto the invention is particularly useful for mixing water with a fertilizer or an insecticide for agricultural and horticultural purposes, or for mixing water with a foaming agent for fire-fighting purposes.

One object of the invention is to enable two fluids to be mixed accurately in a predetermined proportion without, at one time, mixing the whole bulk of the two fluids, that is to say, to provide a method and means whereby the two fluids may be mixed in the predetermined proportion, a little at a time, as they pass through a pipe.

Another object is to use the kinetic energy of a moving stream of one of the fluids to mix the other fluid with the first fluid.

Yet another object is to provide a method and means of controlling the proportion in which two fluids are mixed, as the two fluids are passed along a pipe.

Figure 9:
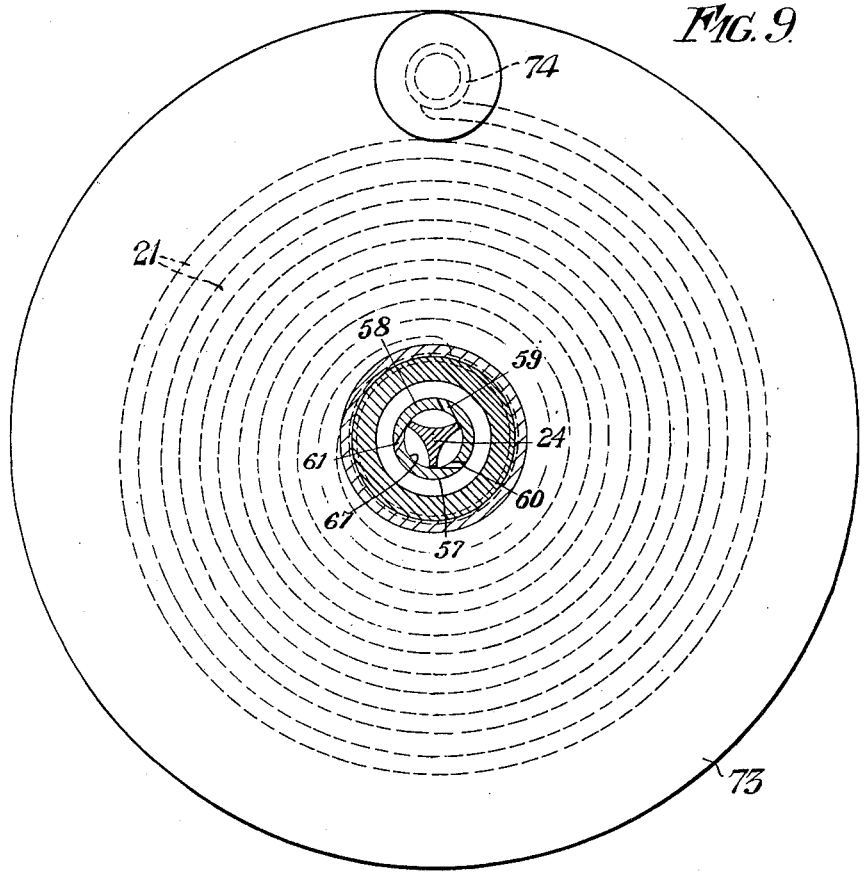
Figure 10:
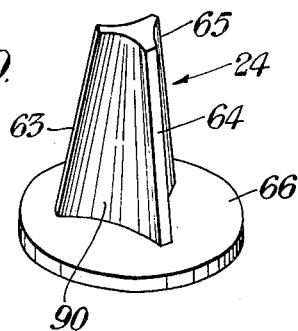

Preferred ways of carrying out the invention will now be described, by way of example, with reference to the accompanying diagrammatic drawings in which Figure 1 is a schematic view illustrating how two fluids may be mixed in a desired proportion in accordance with the invention, Figures 2 and 3 show two ways respectively of mixing three fluids together, Figure 4 illustrates a method of mixing an exceptionally small proportion of one fluid with another fluid, Figure 5 illustrates a mechanical device for interrupting the flow of one of the fluids to be mixed, Figure 6 is an elevation partly in section of a practical form of mixing apparatus, Figure 7 is a perspective view of an interrupting device shown also in Figure 6, Figure 8 is a sectional elevation of another practical embodiment of the invention, Figure 9 is a section on the line IX—IX of Figure 8, Figure 10 is a perspective view of an interrupting device shown in Figures 8 and 9, and Figures 11 and 12 show two forms of apparatus for controlling the quantity of liquid B mixed at each interruption of fluid A.

Like parts in the several figures bear the same reference numbers.

The apparatus illustrated very diagrammatically in Figure 1 comprises a main pipe 20 the exit end 21 of which is fairly long and will be called an inertia column, a branch pipe 22 leading into the main pipe 20 through a one-way valve 23, and an interrupter 24 for periodically blocking fluid passing through the main pipe. The valve is situated in a small chamber 25 which will be called the mixing chamber.

In effect the branch pipe 22 forms a junction with the main pipe 20 and divides it into what might be called an inlet pipe and outlet pipe respectively, the interrupter 24 being on the inlet side of the junction and the one-way valve being in the branch pipe. Although convenient, the mixing chamber need not be constituted as an enlargement of the pipes.

Into the main pipe 20 is passed a moving stream of one of the fluids A to be mixed, which may be water for example, while the branch pipe 22 is placed in communication with a reservoir holding a supply of the other fluid B, which may be a liquid fertilizer for example.

If the interrupter 24 blocks the main pipe permanently no fluid can pass through pipe 20, whilst if the interrupter is permanently open fluid A alone passes along pipe 20 into the inertia column 21 because valve 23 remains permanently closed; in neither case is any of the liquid B drawn into the mixing chamber 25.

If, on the other hand, the interrupter is operated to open and close the pipe 20 periodically, each time the pipe 20 is blocked fluid A is broken into two columns, the following one of which is stopped behind the interrupter and the leading one of which under its own inertia passes on through the inertia column 21 to create a suction effect in the mixing chamber 25 sufficient to open the one-way valve 23 and draw into the chamber a relatively small quantity of the second liquid B, which may or may not suffice to fill the space left vacant by liquid A. When the interrupter opens the pipe 20 again, liquid A joins the small quantity of liquid B drawn into the chamber 25 and the two liquids are mixed there and in their subsequent passage through the inertia column 21. Thus during normal operation it is a mixture of A and B which, in passing through the inertia column 21, serves to create the suction effect in the mixing chamber.

A convenient way of carrying out the mixing is to connect the inlet end of pipe 20 to a stand pipe or a household tap and to place the branch pipe 22 into a pail or bottle holding the second liquid.

If it be desired to keep the proportion in which the liquids are mixed constant, the quantity of liquid A which flows during the period between successive interruptions is kept constant either by keeping both the rate of flow of liquid A and the rate of interruption constant, or preferably by effecting the interruptions by means driven by the water flow at a rate proportional to the rate of that flow, as described in detail later. The quantity of liquid B drawn in at each interruption may also be kept constant by means such as are described below.

The mixing proportion can also be controlled, first by ensuring that a predetermined quantity of fluid B passes through valve 23 at each interruption and then varying this quantity as may be desired. Apparatus for achieving this result will also be described in detail.

The interruptions consist of a series of cycles each comprising a time $T_1$ during which fluid A is blocked and a time $T_2$ during which it flows. It will be seen that the proportion of mixing may be controlled by varying the ratio $T_1/T_2$. This can be done with the aid of a suitable form of interrupter one of which will be described later in detail.

In Figure 2 is shown apparatus for mixing three fluids A, B and C in predetermined proportions. It consists essentially of a main pipe 20, inertia column 21, interrupter 24 and mixing chamber 25 into which lead, in parallel arrangement, two branch pipes 22 and 26 respectively each with its one-way valve 23 or 27.

A stream of the main fluid A is passed into pipe 20 and the branch pipes 22 and 26 lead to reservoirs for the fluids B and C respectively.

The apparatus functions in a manner similar to that of Figure 1.

The arrangement of Figure 3 is similar to that of Figure 2 except that the two branch pipes, 22 and 28 in this case, are fed in series into the main pipe 20, thus necessitating two mixing chambers, 25 and 29, two inertia columns 21 and 30 and two interrupters 24 and 31. That part of the pipe connecting the inertia column 21 to the second interrupter 31 may be of flexible material, so that interruptions produced in the second half of the device do not interfere with the working of the first half.

In Figure 4 is illustrated apparatus for mixing a very small proportion of fluid B with another fluid A.

The main fluid stream A passed into the main pipe 20 is divided into two streams one of which passes through the mixing device 32, similar to the device of Figure 1, where it picks up X% of fluid B entering through the branch pipe 89. In the device 33, also similar to that of Figure 1, the fluid A picks up X% of X% of B, if the devices 32 and 33 are identical. Thus if both devices are adjusted to give a pick-up of 1%, then the final fluid consists of a mixture of 0.01% B in A.

The energy for driving the interrupters may be derived either from the moving stream of fluid A or from a source of energy independent of this stream.

In Figure 5 is illustrated a simple form of interrupter energised independently of the fluids.

The main pipe 20 is formed with a seating 34 receiving a valve 35 loaded by a spring 36 and carried by a rod 37 reciprocated axially by a cam 38 and lever 39 so that the main pipe is periodically opened and closed at the desired frequency, the energy for rotating the cam being derived from means other than the fluids, for example from a source of energy under the control of a chemical recorder measuring the chemical properties of the mixed fluids. The one-way valve is here shown as a ball 23.

In Figures 6 and 7 is illustrated a practical embodiment of the invention suitable for spraying trees with a mixture of water and insecticide and in which the main pipe is opened and closed by an interrupter energised by the moving stream of the main fluid.

The apparatus here shown comprises a main pipe 20, fitted at its inlet end with a hose connector 40 and formed at its outlet end as a jet 41, a coiled inertia column 21 leading to a spraying nozzle (not shown), a branch pipe 22 dipping into a reservoir 42 for insecticide B, a one-way valve 23 in the branch pipe 22, a water-wheel type of interrupter indicated generally at 24 and a mixing chamber 25 containing the valve 23.

The water-wheel 24, shown in perspective in Figure 7, is located in an interrupter chamber 43 and comprises radial vanes 44 and a hollow axial stem 45 carrying a pair of diametrically opposed tapered lugs 46 and 46A, the upper end of the stem being closed. The stem 45 rotates on the top of a vertical tube 47 which is closed at its upper end by the wheel 24 and is formed with a pair of diametrically opposed ports one of which is shown at 48. The lower end 49 of the tube 47 is open and projects sufficiently far into the mixing chamber 25 to act as stop limiting the upward movement of the valve 23.

The axis of the main pipe 20 passes to one side of the axis of the stem 47 and tube 45 so that water issuing from the jet 41 causes the waterwheel to rotate. A tap 50 is inserted in the inertia column 21 for added control.

In use the main pipe 20 is connected, with the aid of the connector 40, to the cold water main of a household water supply and the house tap turned full on. Tap 50 is then opened with the following result:

A stream of water under roughly constant pressure issues from the jet 41 and strikes the vanes 44 to rotate the water-wheel 24 at roughly constant speed. The chamber 43 is filled with water which escapes through the ports 48 when these are uncovered by the lugs 46 and 46A and is blocked when they are covered.

The stream of water passing through the main pipe 20 and chamber 43 is thus periodically broken at the ports 48 and the leading column, passing along the inertia column 21, produces, at its tail-end, a suction effect in the chamber 25 sufficient to lift the valve 23 up against the bottom end 49 of the tube 47 and suck insecticide into the chamber 25 from the reservoir 42.

In order that the proportion in which the water and insecticide are mixed may be varied, means are provided for varying the ratio $T_1/T_2$ of the time of interruption $T_1$ to time of flow $T_2$. It is for this purpose that the lugs 46 and 46A are tapered so that by raising and lowering them on the tube 47 this ratio can be controlled. The wheel 44 is rotatably hung on a peg 51 fixed in a rod 52 screwed into a roof 53 fixed on the chamber 43. By rotating the rod 52, with the aid of a handle 54, the peg 51, and hence the wheel 24, are raised or lowered to uncover or cover the ports 48 more or less. A stop 55 is provided to make sure the lugs are not lowered too far over the ports. The disc 56 may bear a scale and the stop a pointer which together show the proportion in which the liquids are mixed. Control of the spray is given by tap 50.

If, when the spraying has been stopped, the lugs 46 and 46A cover the ports 48 completely, the apparatus can nevertheless be restarted by raising the lugs with respect to the ports, until some water passes through the holes, after which the lugs are returned to the position giving the desired mixing ratio.

Another practical embodiment of the invention is illustrated in Figures 8, 9 and 10, the essential parts of the device illustrated in Figure 1 being present in this embodiment also.

It comprises a main pipe 20, from which water flows, under pressure, through a filter 56 into an annular passage 57 formed in a fixed interrupter holder 58. The holder 58 is formed with three equiangularly spaced non-radial ports 59, 60 and 61 (see Figure 9), through which the water flows inwardly and obliquely to strike against a conical spinning interrupter indicated generally at 24. The interrupter is formed with three equiangularly spaced ribs 63, 64 and 65 (Figure 10) which, three times during every revolution, simultaneously cover the ports 59, 60 and 61. Between the ribs the conical interrupter is cut away as at 90 for example. The conical portion of the interrupter is integral with a disc 66.

The conical interrupter 24 can rotate about its longitudinal axis within a conical seat 67 formed in the interrupter holder 58. The interrupter is also free to move longitudinally within its holder, but its outward movement with respect to the holder is limited by a disc 68 formed with a series of apertures such as that shown at 69.

Water flowing in through the pipe 20 passes through the filter 56 down the annular passage 57, through the ports 59, 60 and 61, to impinge on the vanes 63, 64 and 65 of the interrupter to rotate it so that the vanes periodically close the ports, after which water passes through the apertures 69 into a mixing chamber 25.

Into the mixing chamber leads a branch pipe 22, the outer end of which carries a filter 70 and dips into a reservoir (not shown) for liquid insecticide for example. The inner end of the branch pipe 22 is closed by a one-way valve 23.

Communicating with the mixing chamber 25, via passages 71 and groove 72, is an inertia column 21 in the form of a spiral passage formed in a disc 73 of, for example, a transparent synthetic plastic. At its outer end the inertia column communicates via groove 74 with a nozzle 75 adapted to receive a hosepipe (not shown) on the end of which may be a spraying nozzle of any known or convenient form.

The disc 73 may be constructed in two parts one or both of which is formed with a spiral groove, of rectangular section, after which the two parts are cemented together to form the inertia column shown in Figures 8 and 9.

The device functions in the following way: Water under pressure enters the main pipe 20, passes through filter 56, down the annular passage 57 and is forced through the three oblique ports 59, 60 and 61 to impinge on the conical interrupter 24 to rotate the latter so that the vanes 63, 64 and 65 simultaneously close the ports three times during every revolution of the interrupter.

Each time the vanes are closed water is blocked at these ports and a column passing through the mixing chamber 25 into the inertia column 21 continues on its way towards the nozzle 75 to create a suction effect in the chamber 25 sufficient to lift the valve 23 off its seat and suck into the mixing chamber a relatively small quantity of insecticide from the branch pipe 22. Water and insecticide are in this way alternately admitted into the mixing chamber 25 at high frequency. The two liquids are mixed and thereafter pass into the inertia column 21 and thence to the nozzle 75.

When the interrupter 24 is rotating at normal speed water held in the three cut-away spaces such as that indicated at 90 in Figure 10 is rotating at sufficiently high speed to cause by centrifugal force a reduction in pressure behind the disc 66 relative to that outside it sufficient to draw the interrupter into its seating and hold it there.

If, when the apparatus is stopped, the interrupter comes to rest with the vanes 63, 64 and 65 in between the ports 59, 60 and 61, then on restarting the flow of water into the main pipe the water impinges on the sides of the vanes and restarts the interrupter.

If, on the other hand, the interrupter comes to rest with the vanes fully blocking the ports, then, when pressure is turned on again in the main pipe the pressure of water at the ports 59, 60 and 61 is effective to throw the interrupter slightly out of its cup, after which water can escape through the ports to start the interrupter into rotation, whereupon the centrifugal action of water held in the cut-away spaces 90 is effective once more to draw the interrupter back into its cup-like seating.

The apparatus illustrated in Figures 8, 9 and 10 operates in such a way that the frequency of the interruptions is closely proportional to the rate of flow of the water through it, because the interrupter is not only rotated by the water flow, but is also held on its seating solely by forces derived from the flow so that the frictional resistance to its rotation is proportional to the kinetic energy of the flow driving it. Consequently the amount of water flowing during the period between successive interruptions is closely constant. The ratio $T_1/T_2$ of the time of interruption to the time of flow is also constant, being determined by the construction of the vanes 63, 64, 65. Accordingly the apparatus operates to mix the two fluids in a fixed proportion, whether the arrangement of the branch pipe 22 and valve 23 be such as to exert no restriction on the flow of fluid B or whether their arrangement be such as to permit only of a fixed volume of the latter being taken in at each interruption. To enable the proportion in which the fluids are mixed to be varied at will, the apparatus illustrated in Figures 11 and 12 can be used in conjunction with the apparatus of either Figure 6 or 8.

The apparatus illustrated in Figure 11 comprises a one-way valve 23 controlling a branch pipe 22 leading to one of the fluids B to be mixed.

Between the valve 23 and branch pipe 22 is built what will be called a compliance chamber 76 into which the branch pipe 22 leads by way of a port 77 of section smaller than the opening of the valve 23. This compliance chamber is closed at one end by an elastic closure or compliance, described in detail below, which permits changes in the volume of the compliance chamber.

Each time the valve 23 is opened by the interrupter device 24 of Figure 6 or 8 the compliance chamber 76 is emptied to the extent of the reduction of its volume permitted by the compliance, and between successive openings of the valve 23 the compliance chamber is refilled by fluid B sucked in through the restricted orifice 77 from the branch pipe 22, and in order that the quantity of fluid thus transmitted through the chamber 76 may be varied the movements of the compliance are made controllable.

The compliance which closes the lower end of chamber 26 consists of a flexible disc 78 attached at its centre by a rivet 79 to a leafspring 80 against which bears an adjusting screw 81 threaded through a retaining member 82 itself screwed into a wall of the compliance chamber.

In operation each time the valve 23 opens liquid B is withdrawn from the compliance chamber 76 at the same time sucking in the flexible disc 78 and spring 80, allowing the emptying of the chamber 76 to take place quickly. As soon as the valve 23 closes again the leaf spring 80 draws the flexible disc 79 back to its original position and produces a suction in the chamber 76 sufficient to draw in liquid B through the restricted orifice 77.

Inward movement of the disc 78 is limited by the shoulder 83 and outward movement by the screw 81. In consequence, the quantity of liquid that can be drawn suddenly through the valve 23, irrespective of flow through the branch pipe 22, is adjustable by the setting of the screw 81.

A scale or scales may be engraved on the head of the screw 81 to facilitate regulation of the mixing proportions.

Another form of compliance is illustrated in Figure 12.

It comprises the usual valve 23 controlling a branch pipe 22 through a restricted orifice 84 by way of a compliance chamber 85. In the chamber 85 is arranged an expansion bellows 86 the elongation of which is limited by the underside of the seating of valve 23, while its contraction is controllable by a rod 87 the outer end of which is threaded to receive a screw 88.

By rotation of the screw 88 the extent of the movement permitted to the inner end of the bellows 86 can be varied to vary the quantity of liquid passing through valve 23 each time this valve opens.

I claim:

1. Apparatus for mixing two liquids in predetermined proportions, comprising a main pipe through which may be passed a moving stream of one of the liquids to be mixed, a branch pipe through which may be passed the other liquid, joining the main pipe and forming with it a junction which divides the main pipe into inlet and outlet pipes, an interrupter mounted for rotation in the inlet pipe in such manner that it may be rotated by the liquid passing through the main pipe and serving periodically to block the main pipe so as to divide the liquid passing therethrough into two columns, one of which is stopped and the other of which can continue along the outlet pipe under its own inertia, and a one-way valve in the branch pipe, the arrangement being such that each time the one liquid is broken into two columns a suction effect is produced at the junction sufficient to open the valve and draw a quantity of the other liquid into the main pipe.

2. Apparatus as claimed in claim 1, comprising a chamber in the main pipe housing the rotatable interrupter, the wall of the chamber having ports disposed transverse to the axis of rotation of the interrupter so that the latter recurrently covers and uncovers such ports during its rotation.

3. Apparatus as claimed in claim 1, comprising means for varying the ratio of the time of interruption to the time of flow.

4. Apparatus as claimed in claim 1, comprising means for controlling the quantity of fluid drawn into the main pipe at each interruption of the flow.

5. Apparatus as claimed in claim 1, comprising an interrupter chamber located in the main pipe, within the interrupter chamber a fixed conical seating, a conical vaned interrupter rotatably mounted in said seating and transverse ports formed in the seating through which one of the fluids to be mixed may pass inwardly to impinge upon the interrupter vanes which serve to close the ports periodically.

6. Apparatus as claimed in claim 1, comprising an interrupter chamber located in the main pipe, a tapering seating fixed in the interrupter chamber and a tapering interrupter rotatably mounted in the seating in such manner that during its normal rotation it is urged against its seating by hydraulic force derived from centrifugal force, but is free to move away from its seating when rotation ceases.

7. Apparatus as claimed in claim 1, comprising a disc formed with an internal spiral passage constituting the outlet end of the main pipe.

JOHN HENRY JEFFREE.

REFERENCES CITED

The following references are of record in the file of this patent:

UNITED STATES PATENTS

| Number | Name | Date |
|---|---|---|
| 1,715,140 | Martin | May 28, 1929 |
| 1,720,326 | Halstead | July 9, 1929 |
| 2,291,032 | Francfort | July 28, 1942 |
| 2,508,958 | Manville | May 23, 1950 |